April 22, 1969 — E. SMITH — 3,439,582
ROTARY ENGINE
Filed Nov. 13, 1967 — Sheet 1 of 4

INVENTOR.
ELWOOD SMITH
BY Lyon & Lyon
ATTORNEYS

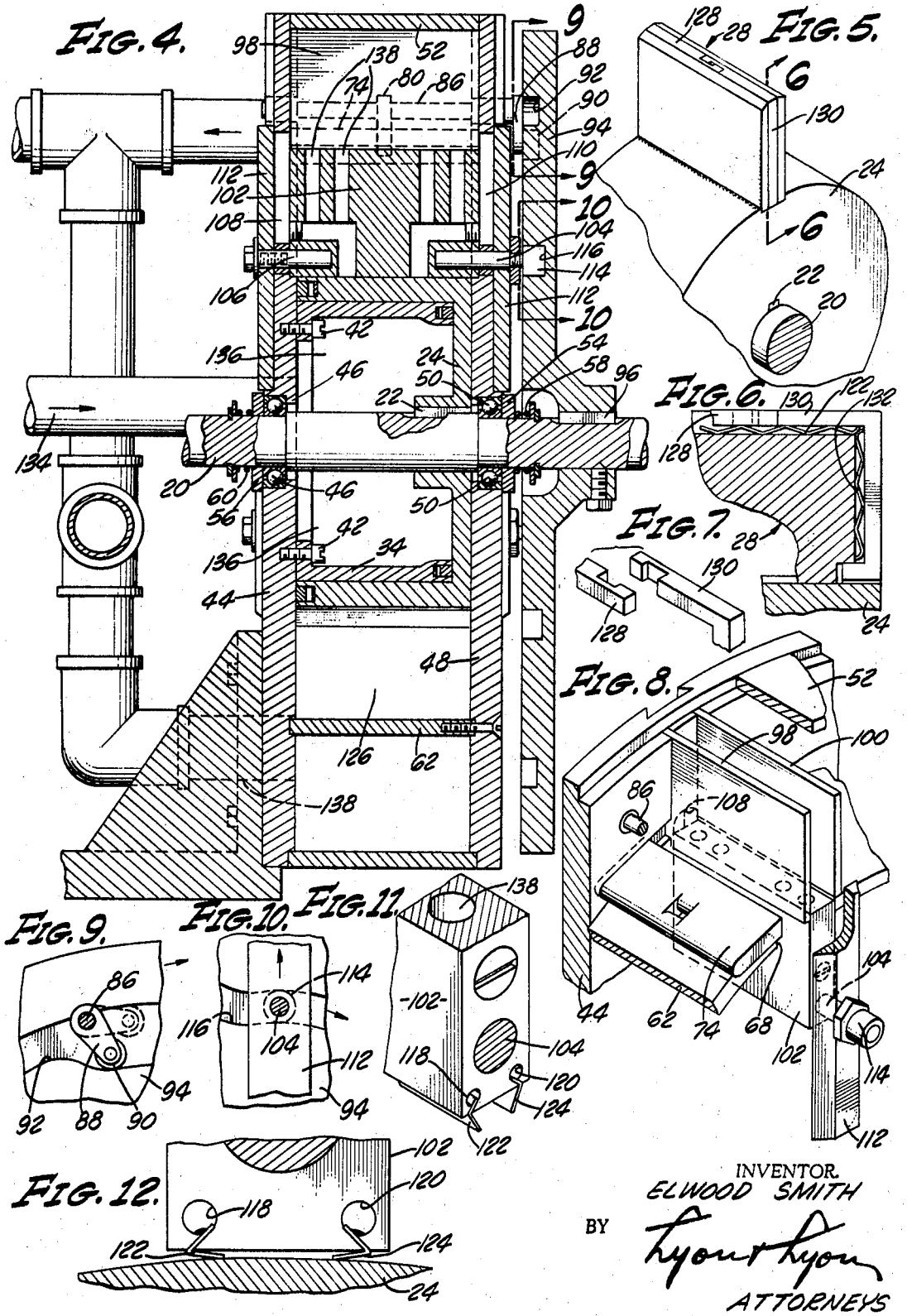

April 22, 1969

E. SMITH 3,439,582

ROTARY ENGINE

Filed Nov. 13, 1967

INVENTOR.
ELWOOD SMITH
By
Miketta, Glenny, Poms & Smith
ATTORNEYS.

April 22, 1969

E. SMITH 3,439,582

ROTARY ENGINE

Filed Nov. 13, 1967

INVENTOR.
ELWOOD SMITH

By
Mikella, Glenny, Poms & Smith

ATTORNEYS.

United States Patent Office 3,439,582
Patented Apr. 22, 1969

3,439,582
ROTARY ENGINE
Elwood Smith, 1728 N. Gramercy Place,
Hollywood, Calif. 90028
Continuation-in-part of application Ser. No. 433,365,
Feb. 17, 1965. This application Nov. 13, 1967, Ser.
No. 687,413
Int. Cl. F01c 1/00
U.S. Cl. 91—99                                  7 Claims

ABSTRACT OF THE DISCLOSURE

A rotary engine for use with a pressure fluid such as steam and having a driven shaft, a rotor means coaxial with said shaft and between stationary walls which extend radially beyond the rotor means to define a coaxial annular fluid pressure chamber, spaced radially extending vanes on the rotor means movable in said chamber, radially movable gates guided on said stationary walls in said pressure chamber and cooperable with said vanes. Pressure fluid is directed along an intake path through said rotor means into said pressure chamber and thence along an exhaust path from said pressure chamber through a hollow portion of the driven shaft. In one example, a rotor means has a partition wall forming with the stationary walls an intake chamber portion and a coaxially exhaust chamber portion. Control means are provided in the intake chamber portion for regulating pressure fluid admitted to the pressure chamber.

---

This is a continuation-in-part application of application for United States Letters Patent Ser. No. 433,365 filed Feb. 17, 1965, entitled "Rotary Engine," said application Ser. No. 433,365 being abandoned in favor of the present application.

Most engines which are powered by gases, steam, or pressure fluid are turbines where blades or buckets on a rotor are hit or impinged by high pressure jets of steam projected at great speed from a series of nozzles. Their valve is rated by the efficiency they develop and the efficiency is allied to the consumption of fuel. This efficiency is developed by the reuse of the steam or gases as the gases expand during work, this expansion is far more effective to provide speed of rotation rather than for torque as the gases are continuously reapplied. More torque is developed if full power is continuously applied, but a lower efficiency rating results.

The present invention relates to a novel rotary engine and more particularly to a rotary engine designed to be driven by a suitable pressure fluid such as steam or combustion gases acting upon vanes secured to a rotor means to drive a shaft and provide high torque and high efficiency. The present engine provides constant driving power without any dead spaces or slack points in the rotation of the driving shaft.

This invention provides high power and direct torque from steam or combustion gases without resorting to the use of crank, which is relatively inefficient, in order to convert a straight-line piston stroke into a rotary motion for turning a shaft. The vanes of the present invention are fixed to a rotor mounted on a drive shaft and rotating within a cylinder having a pressure chamber. All power is delivered at full radius leverage without any dead center or other inherent deterrent.

It is therefore an object of the present invention to provide a rotary engine powered by fluids such as steam or combustion gases for the rotation of a drive shaft with a constant delivery of high torque. Two diametrically opposed vanes mounted on a rotor in a chamber are always under power and always drive the shaft without slack points at which momentum or other assistance is required. The torque from the gases is direct and all power is delivered to the shaft at full radius leverage.

A further object of the present invention is to provide a rotary engine providing a delivery of power to the drive shaft which requires no gear reduction in ordinary working use. The power delivered to the drive shaft can be adjusted without reduction gearing by adjusting the rate of delivery and pressure of the gases utilized to drive the pistons.

Another object of the present invention is to provide an engine to provide a source of power which engine is lighter in weight and occupies less space than is at present required for known turboelectric drives. Further, the engine can be made in any size or in multiples to provide for required conditions. The great torque power of this design makes it possible to use a smaller engine without disadvantage.

Still another object of the present invention is to provide an engine of substantial economy as cheap oils are utilized to provide the combustion gases instead of high octane gasoline or other expensive fuels.

A still further object of the present invention is to provide a construction of maximum simplicity, efficiency, economy and ease of assembly and operation.

Still a further object of this invention is to provide an engine wherein the driving vanes are under constant driving pressure which is balanced within the system.

Another object of the present invention is to disclose and provide a novel construction and arrangement of a rotor means for such a rotary engine.

A still further object of the invention is to disclose and provide a rotor means for a rotary engine of the type mentioned above, wherein the rotor means includes intake and exhaust chamber portions arranged in coaxial relation with respect to a driven shaft.

A further object of the invention is to disclose and provide a rotary engine of the type mentioned above wherein a control means is provided in the intake chamber portion of the rotor means, and wherein exhaust means are provided through an exhaust chamber portion of the rotor means.

A still further object of the invention is to disclose and provide a means for reciprocally moving gate means or abutment means in an annular pressure chamber in timed relation to a rotor means coaxial with said annular chamber, the gate moving means including an actuating member operable radially outwardly of the pressure chamber.

It is a general object of the invention to disclose and provide a rotary engine of relatively simple construction which avoids the use of a complex arrangement of a multiplicity of moving parts and valves and arranged for facile repair or replacement of parts.

Other objects and advantages of the present invention will be readily apparent from the following description of the drawings in which exemplary embodiments of the invention are shown.

In the drawings:

FIG. 4 is a view taken along line 4—4 of FIG. 1.

FIG. 5 is a fragmentary perspective of the vane drum.

FIG. 6 is a view taken along line 6—6 of FIG. 5.

FIG. 7 is a fragmentary perspective of the vane seal.

FIG. 8 is a fragmentary perspective of the gate and valving arrangement.

FIG. 9 is a view taken along line 9—9 of FIG. 4.

FIG. 10 is a view taken along line 10—10 of FIG. 4.

FIG. 11 is a fragmentary perspective of one of the gates.

FIG. 12 is a fragmentary side elevation of one of the gates in contact with the drum.

Figure 1:
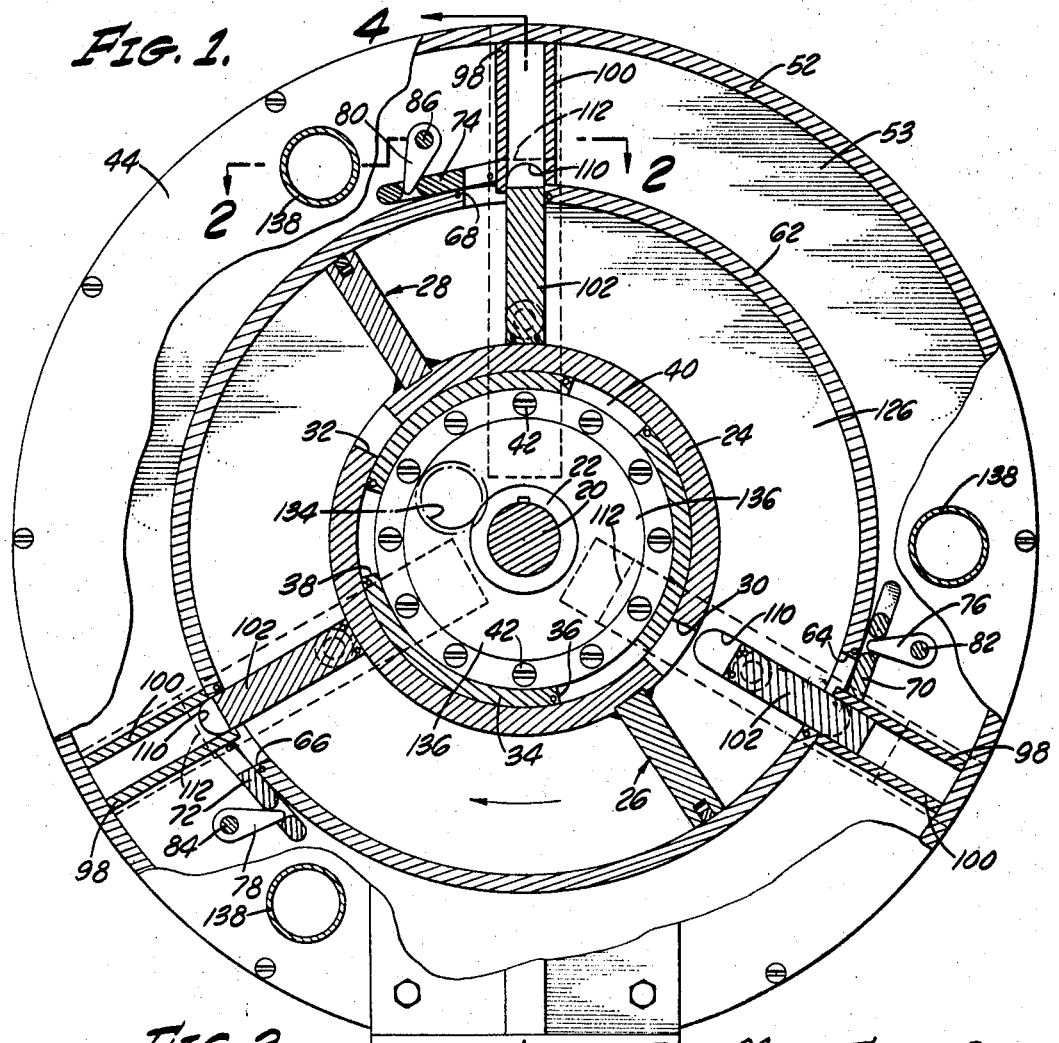
FIG. 1 is a side elevation partially in section of an engine embodying this invention.
Figure 2:
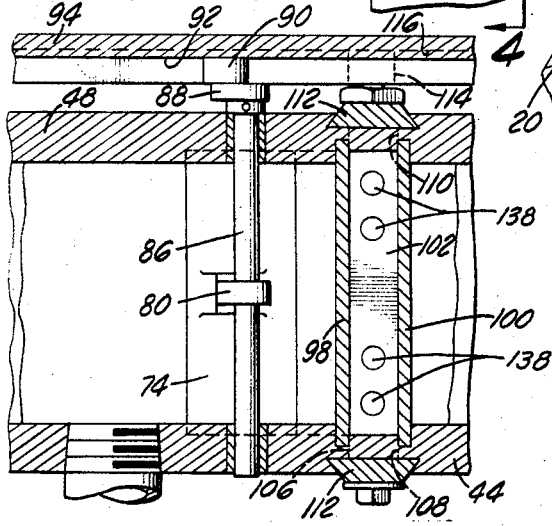
FIG. 2 is a view taken along line 2—2 of FIG. 1.
Figure 3:
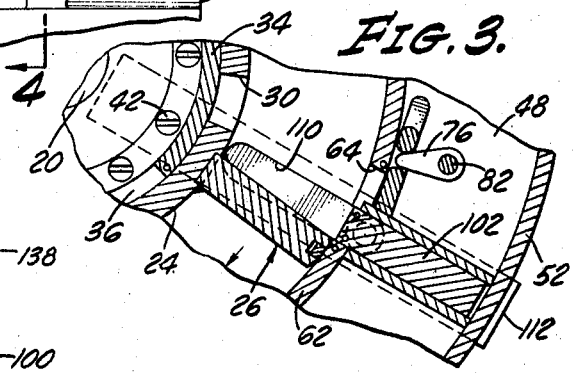
FIG. 3 is a fragmentary section illustrating withdrawal of the gate.
Figure 13:
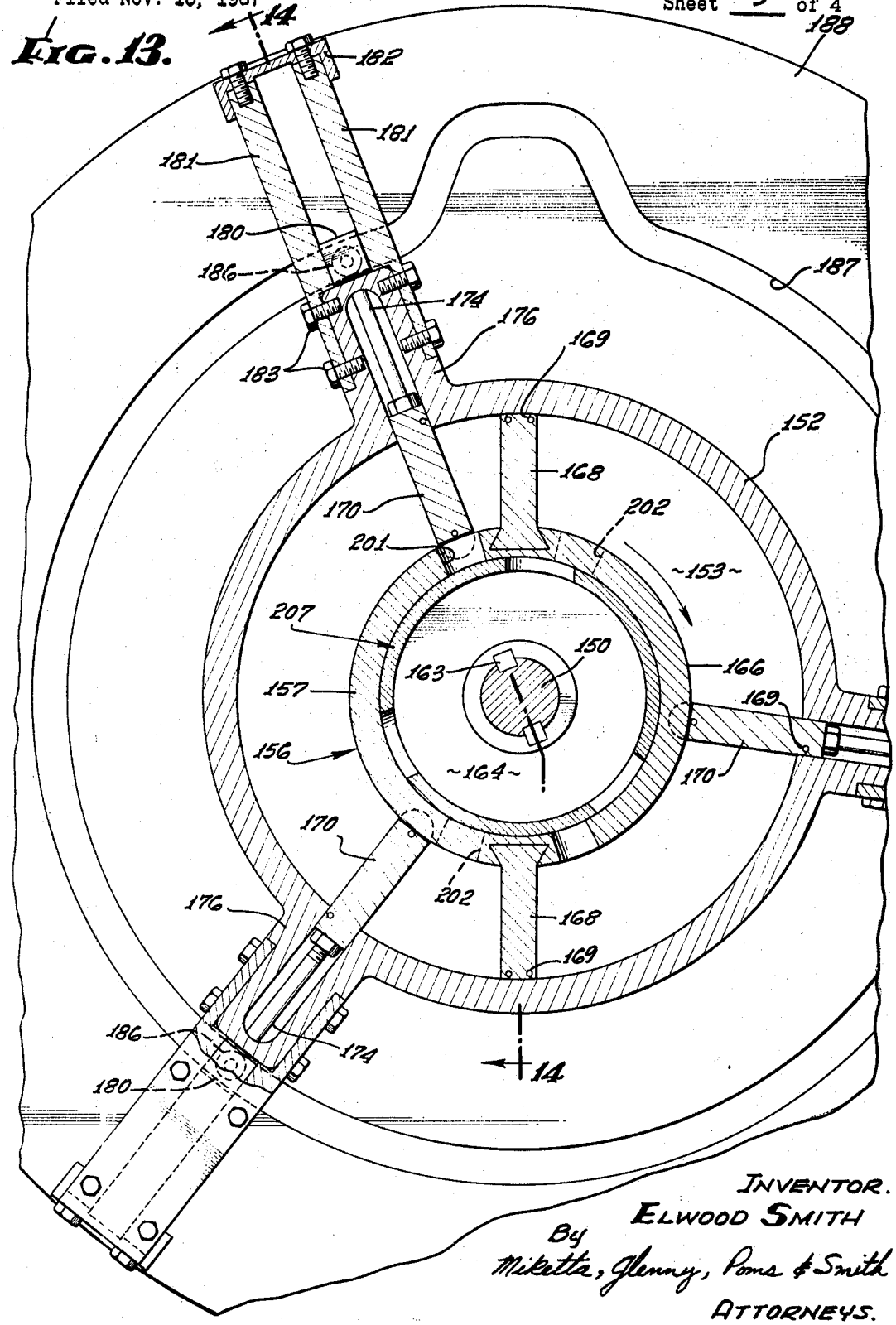
FIG. 13 is an enlarged fragmentary sectional view of a rotary engine embodying a modification of this invention, the section being taken in a vertical plane passing through the horizontal shaft approximately midway between the housing side walls.

Referring first to FIGS. 1–11 inclusive there is shown a rotary engine embodying the construction described and claimed in my copending application Ser. No. 433,365 and in which generally speaking a rotatable driven shaft has mounted thereon a stationary housing within which a rotor means is fixed to the driven shaft. Outboardly of the stationary housing a cam plate means is keyed to the driven shaft, the cam plate means serving to actuate gate lifting means for permitting correlated passage of a plurality of vanes fixed to said rotor means and operable within a pressure chamber defined by the stationary housing. Intake fluid passageways are provided for pressure fluid to be introduced into the pressure chamber through the rotor means, and exhaust fluid passageways are provided for exhausting the pressure fluid from the pressure chamber.

In the example of the present invention shown in FIGS. 13–16 inclusive, a different embodiment of the rotary engine means is shown, the differences comprising generally a modified rotary means which provides an intake pressure fluid chamber and an exhaust pressure fluid chamber, a control means in said intake chamber portion and a modified gate actuating means.

Referring first to FIG. 4 a shaft 20 to be driven is mounted in suitable supports not illustrated. Keyed to the shaft as at 22 is a drum 24 which as secured thereto as by welding a pair of opposed vanes 26 and 28. Slots 30 and 32 are provided in drum 24 immediately to the rear of each vane.

Intake control from direct to expansion drive positioned within rotating drum 24 is a stationary drum 34 which has three slots 36, 38, and 40 spaced an equal distance from one another. The stationary drum is secured by, for example, screws 42 to side plate 44 journaled by bearings 46 on shaft 20. A second side plate 48 is journaled on shaft 20 by bearings 50. A cylindrical plate 52 at the periphery of the plates encloses the space between same, forming a housing. Seals 54 and 56 are urged by springs 58 and 60, respectively, into contact with adjacent bearings.

A second cylindrical plate 62 is secured within the housing spaced from the first plate 52, forming an exhaust chamber 53. This plate has three exhaust ports 64, 66 and 68 therein. Adjacent each port is a slide valve 70, 72 and 74, respectively, adapted to block off blow therethrough when desired. The valves are actuated by pivotal levers 76, 78 and 80 rigidly mounted upon shafts 82, 84 and 86. Each shaft has a crank such as 88 at its end which carries a cam 90 which rides in cam track 92 in cam plate 94. The cam plate is keyed to shaft 20 as at 96 and rotates therewith. Thus, each slide valve is actuated by the movement of its cam to open or shut its exhaust port in proper sequence.

Mounted in the exhaust chamber adjacent each exhaust port are a pair of plates such as 98 and 100. A gate 102 is mounted to reciprocate between said plates. The gate has a shaft 104 and 106 projecting through slots 108 and 110 in side plates 44 and 48, respectively, and are secured to slides such as 112 which dovetail into the slots 108 and 110. Shaft 104 carries a cam 114 which fits into a second cam track 116 in cam plate 94 so that each gate reciprocates in a predetermined manner as the cam plate 94 and drum 24 rotate with shaft 20.

To provide a seal with the drum 24, the lowermost extremity of each gate has a pair of spaced-apart longitudinal bores such as 118 and 120 within which one side of sealing strips 122 and 124 are suitably secured.

Further, to provide a suitable seal between the vanes and plate 62 within drive chamber 126, each vane has a peripheral groove therein receiving interlocking strips 128 and 130 urged by leaf springs 132 outwardly and upwardly from the vane.

In operation, fluid of any suitable type is admitted through supply line 134 into the supply chamber 136, passing out one of the ports, for example port 36, through port 30 to the rear of vane 26. As soon as flow commences, cam track 116 has been formed to have gate 102 at the forward position contacting drum 24. Thus, the pressure on vane 26 rotates the drum. The cam track 92 has moved the slide valves so that valve 70 blocks off port 64 while valve 72 opens port 66, permitting flow through exhaust line 138. As vane 26 approaches port 66, the adjacent gate 102 withdraws and slide valve 72 moves to cover port 66. In this manner each gate is withdrawn in proper sequence to permit the vanes 26 and 28 to pass. The gates are moved forward after a vane passes to block off chamber 126 to the rear. Ports 140 have been cut in the gates 102 to reduce the weight thereof and equalize pressure which would otherwise resist their movement. The size of ports 30, 32, 36, 38, and 40 is such that both vanes 26 or 28 are under pressure from the fluid utilized as a power source at all times.

In the embodiment of this invention shown in FIGS. 13–16 inclusive, which is a preferred embodiment, differences in construction will be emphasized and will become readily apparent when compared to the construction of the prior embodiment.

Figure 14:
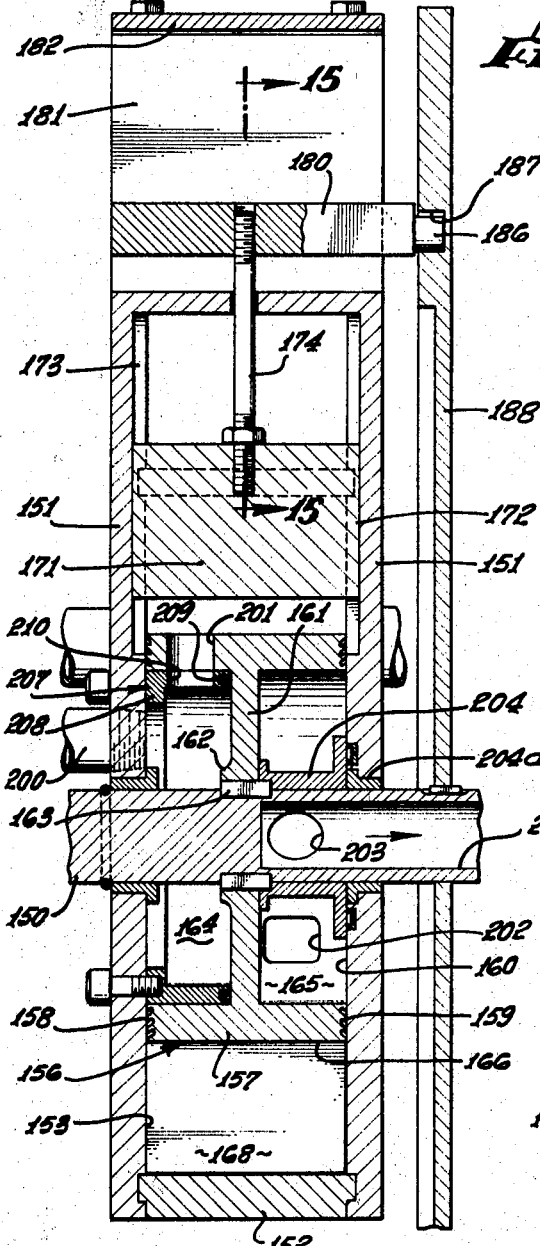
FIG. 14 is a sectional view taken in the planes indicated by line 14—14 of FIG. 13.
Figure 15:
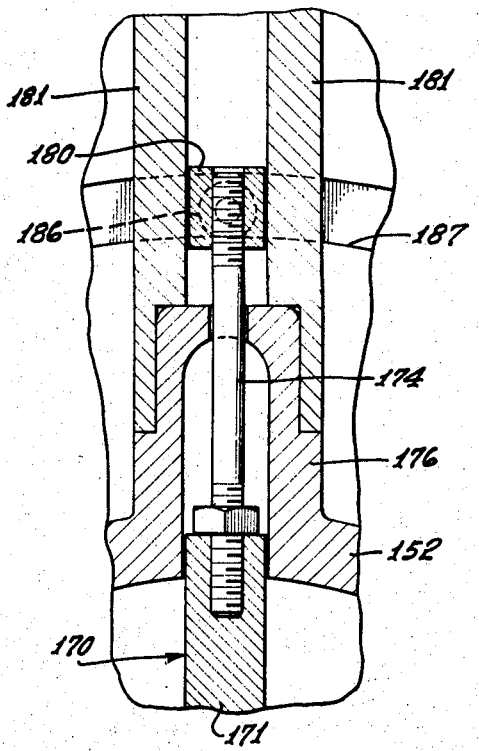
FIG. 15 is an enlarged fragmentary view of guide means for the gate means.

In FIG. 14 a driven shaft 150 may be supported by any suitable frame, base or other support means not shown. Anti-frictionally mounted on shaft 150 are a pair of axially spaced stationary circular outer housing walls 151 connected at their circumferential edge portions by a cylindrical peripheral housing wall 152 which forms with walls 151 an annular fluid pressure chamber 153.

Within chamber 153 is a rotor means 156 which comprises a cylindrical rotor wall 157 having side edges 158 provided with suitable sealing means 159 comprising a plurality of angularly directed annular grooves to create turbulence of pressure fluid for substantial sealing between internal surfaces 160 of outer walls 151 and edges 158. Rotor wall 157 may be integral with a central intermediate radially inwardly extending web or partition wall 161 which includes a hub 162 keyed to driven shaft 150 by key 163. Partition wall 161 defines with rotor wall 157 an intake pressure fluid chamber 64 and an exhaust pressure fluid chamber 165. Fixed on the outer cylindrical surface 166 of rotor wall 157 are radially outwardly extending vanes 168 which sweep pressure chamber 153. The side and top edges of vanes 168 may be provided with seal means 169 acting against outer walls 151 and peripheral wall 152. Vanes 168 are diametrically opposed and in this example of the invention divide pressure fluid chamber 153 into semi-circular chamber halves.

In the path of rotation of vanes 168, radially movable gate means 170 are slidably guided in and out of each chamber half during rotation of rotor means 156 to permit passage of vanes 168 and to provide working chamber portions between each vane and gate means 170. In this embodiment each gate means 170 may comprise a plate-like body 171 having edge portions 172 slidably received within radial guide grooves 173 formed in the internal surface of the outer walls. Each gate means 170 may be carried by a support rod 174 having a threaded connection thereto and extending radially outwardly generally in a plane between walls 151. The rod 174 and gate means 170 are movable into a gate lift housing 176 provided on the outer surface of the peripheral wall 152. In fully retracted position the gate means 170 lies within the gate lift housing 176 and the bottom edge of the gate means is positioned outwardly of the top edge of vane 168 to permit passage of the vane thereby.

Means for lifting each gate means 170 out of the pressure chamber 153 to permit passage of a vane 168 may comprise a cam roller 186 carried at one end of gate lift bar 180 and movable in a cam groove 187 formed in the surface of a rotatable cam disk 188 fixedly mounted on shaft 150. Adjacent each gate lift housing 176 an outwardly and inwardly curved configuration of cam groove 187 causes the lifting bar 180 and the attached gate means 170 to move radially outwardly and then radially inwardly to clear a passing vane 168. Since the cam disk 188 and the rotor means 156 are fixed to the driven shaft 150 and the cam disk 188 is aligned in registration with a vane 168, it will be readily apparent that movement of the gate means 170 is accurately correlated with the passage of a vane 168.

Means for guiding lift bar 180 in its radial path as defined by cam groove 187 may comprise a pair of parallel guide plates 181 secured at their inner ends to the gate lift housing as by bolts 183. The outer ends of plates 181 may be secured together and connected by a cover plate 182. It will thus be apparent that as lift bar 180 moves radially inwardly and outwardly along curved portions of cam groove 187 the guide plates 181 prevent any twisting or misalignment of the lift bar 180.

Figure 16:
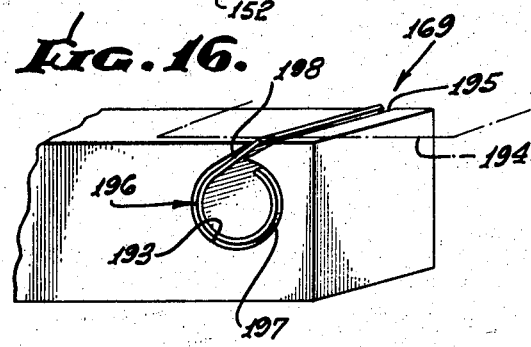
FIG. 16 is a fragmentary respective view of a novel seal means used in the rotary engine of FIG. 13.

Before describing operation of this embodiment of the invention it is important to note that in FIG. 16 novel seal means 169 is provided for effecting a pressure responsive seal between moving and stationary members of the rotary engine, as between the vane 168 and stationary walls 151 and 152 of the pressure chamber 153. In this example of such seal means, a bore 193 having an axis parallel to a surface 194 (indicated in phantom lines) to be sealed may be drilled in spaced relation to such surface. A relatively narrow slot 195 parallel to the bore axis and tangential to a bore surface opens toward the surface to be sealed. A seal member 196 having a generally cylindrical base 197 of slightly less diameter than the diameter of the bore is received within the bore. The cylindrical base 197 merges with a tangential flat lip portion 198 which extends through slot 195 and projects outwardly beyond the slot opening a slight preselected distance such as .003–.006 inch depending upon tolerances used between the two surfaces. The protruding lip portion 198 is inclined to the pressure fluid and under pressure is forced against the surface to be sealed, pressure fluid causing slight rotation of the seal member 196 about its bore axis to cause contact of the back face of the lip portion 198 with the support or backup edge of the slot 195.

The seal means 196 may be made of a suitable metal such as beryllium copper which has been tempered or heat treated. Friction between a metal such as steel and beryllium copper is minimal and resultant pressure forces acting through a space or tolerance between surfaces in the order of .003–.006 is negligible. It will be apparent that cylindrical base 197 permits shifting and slight rotation of the seal means within the bore so that the lip portion 198 may readily adjust itself to proper sealing position.

Pressure fluid such as steam may be conducted to a suitable inlet fitting 200 to enter the intake chamber portion 164 of the rotor means 156 where the pressure fluid is admitted to the pressure chamber 153 through an intake opening or port 201 provided in rotor wall 157. Port 201 is located proximate to the trailing face of a vane 168 so that fluid enters a pressure chamber portion when it is at its smallest volume as determined by the relative positions of the two vanes 168 and the three gate means 170. Pressure fluid acting in such chamber portion thus causes the rotor means to turn, expanding the pressure chamber portion until gate means 170 is again lifted for passage of the other vane 168.

Means for controlling volume of intake pressure fluid emitted from intake chamber portion 164 to pressure fluid chamber 153 may comprise an annular control ring 207 of angle section having one leg 208 seated against outer wall 151 and its other leg 209 extending coaxially and into sliding engagement with rotor wall 157 and web 161 of rotor means 156. Leg 209 may be provided with a circumferentially extending port 210 of selected length and the flow area of this port together with the flow area of port 201 of the rotor means determines volume of pressure fluid introduced into the pressure chamber 153. Control ring 207 may be preset and adjusted at the time of assembly of the rotary engine.

Fluid in such a pressure chamber portion is discharged therefrom through an exhaust port 202 located in rotor wall 157 just forwardly the leading face of a vane 168 and at the end of rotor wall 157 opposite the intake port. Exhaust port 202 leads to exhaust rotor chamber portion 165 where the exhaust fluid is discharged through a shaft port 203 extending through an annular channel section thrust and spacer member 204 positioned between partition 161 and stationary wall 151. Thrust member 204 abuts web 161 and is supported by thrust bearings 204a mounted in outer wall 151 so that member 204 may turn with rotor means 156 and thrust forces from pressure fluid entering intake chamber portion 164 and acting on web 161 will not cause binding of the rotor against the stationary housing walls. The exhaust fluid passing through the shaft port 203 passes into an axial bore 205 provided in the driven shaft 150 at one side of the rotary engine and the exhaust fluid bore 205 conducts the fluid to a discharge opening suitably located in the shaft.

It is important to note that the pressure fluid in the pressure chamber drives against the rear face of the vane 168 and as the energy in the pressure fluid is spent in the work that it performs in turning the rotor, exhaust of such spent pressure fluid is performed by the following or succeeding vane on the rotor which drives the spent fluid through the exhaust port in the rotary wall.

Control means 207 provides by suitable selection of ports a choice between maximum power at less economy or maximum economy at the expense of partially reduced power. Such a change may be accomplished by employing different control rings provided with different size ports as in example, if the ports are sufficient to provide passage of pressure fluid during one-third of the distance between the gate means it has been found that maximum efficiency is provided. The energy of the pressure fluid which is represented by the driving thrust continues against a vane until the inflow of pressure fluid is cut off by the control port in the control ring thus for approximately two-thirds of the distance between the gate means no more pressure fluid is introduced into the pressure chamber and therefore is not used. Thus in the example shown and in a rotary engine having diametrically opposed rotary vanes, the driving power of the pressure fluid is virtually continuous.

Figure 17:
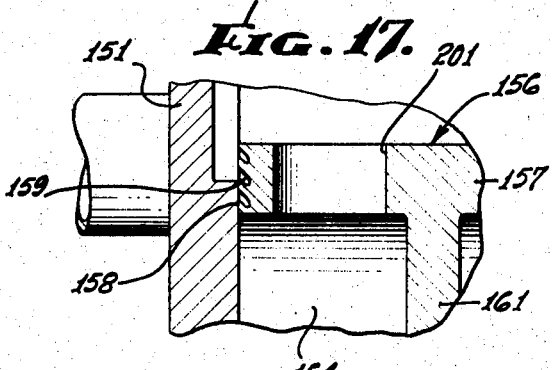
FIG. 17 is a fragmentary enlarged view of a portion of the rotor means and is taken in the same plane as FIG. 14, this section illustrating a modification of the pressure fluid intake means.

In FIG. 17 a modification of the pressure fluid intake chamber is illustrated in that control means 207 is omitted. In such modification intake port 201 leading from the intake pressure chamber portion 164 to the pressure fluid chamber 153 may be suitably enlarged so that a selected volume of pressure fluid may continuously enter the pressure chamber.

It will thus be apparent to those skilled in the art that a novel arrangement of a rotor means provided with coaxially spaced intake and exhaust chamber portions has been provided by the generally T-section rotor means 156. It should also be noted that pressure fluid is exhausted through the driven shaft and that because of the arrangement of the intake and exhaust ports in the rotor wall 157 there is a continuous flow of pressure fluid through the pressure chamber 153 and which continuously reacts against the rotor vanes 168.

All modifications and changes coming within the dependent claims are embraced thereby.

I claim:

1. In a rotary engine having a stationary housing defining an annular fluid pressure chamber provided with a plurality of radially inwardly and outwardly moving gate means and a rotor means having radially outwardly extending vanes in said annular pressure chamber, the combination therewith of:

means for introducing pressure fluid into said pressure chamber comprising means defining a fluid intake chamber portion radially inwardly of said annular chamber and within said rotor means in coaxial relation thereto;

means for defining a fluid exhaust chamber portion within said rotor means in coaxial tandem relation to said intake chamber portion and in communication with said annular pressure chamber;

and means for exhausting pressure fluid from said exhaust chamber portion.

2. In a rotary engine as stated in claim 1 wherein said means defining said intake and exhaust chamber portions includes radial partition wall means in said rotor means.

3. In a rotary engine as stated in claim 1 including a control means for flow of intake pressure fluid into said annular pressure chamber:

said control means being carried by one of said walls of said stationary housing within said intake chamber portion, and including a cylindrical ported flange extending in radial spaced relationship to said drive shaft and adjacent to the peripheral wall of said rotor means.

4. In a rotary engine as stated in claim 1 including:

means for guiding said gate means carried by said stationary housing;

and including a gate lift bar connected with a gate means.

5. A rotary engine as stated in claim 4 wherein said guide means includes spaced parallel guide plates on opposite sides of said gate bar.

6. In a rotary engine as stated in claim 1 wherein said means for introducing pressure fluid into said pressure chamber includes an intake port adjacent the trailing face of a rotor vane; and wherein said means for exhausting pressure fluid from said exhaust chamber portion includes an exhaust port in said rotor means spaced axially from said intake port and forwardly of the leading face of a rotor vane.

7. In a rotary engine as stated in claim 1 wherein said means for exhausting pressure fluid from said exhaust chamber portion includes:

an exhaust port adjacent the leading face of a rotary vane;

and an exhaust port leading from said exhaust chamber portion to an exhaust passageway extending along a driven shaft.

References Cited

UNITED STATES PATENTS

| | | | |
|---|---|---|---|
| 660,676 | 10/1900 | Andersson | 91—105 |
| 723,226 | 3/1903 | Anderson | 91—105 |
| 1,793,643 | 2/1931 | Seaholm | 91—73 |
| 1,900,784 | 3/1933 | Zint | 91—105 |

EVERETTE A. POWELL, Jr., *Primary Examiner.*

U.S. Cl. X.R.

91—107